June 19, 1951 E. L. KAFFER 2,557,112
COMBINED CONTAINER AND COVER
Filed Feb. 6, 1947
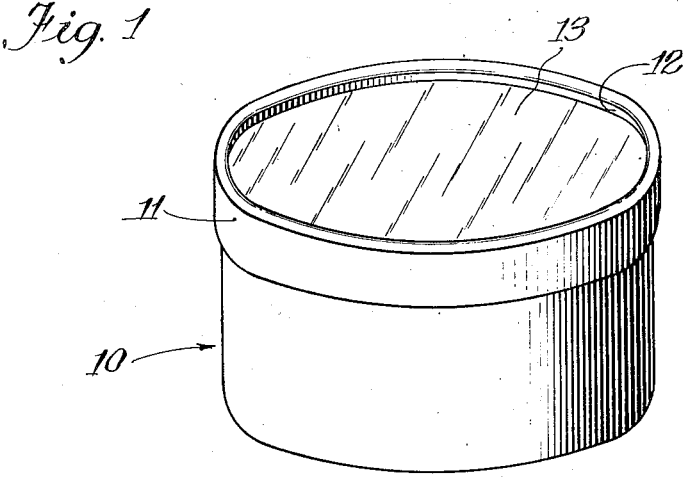
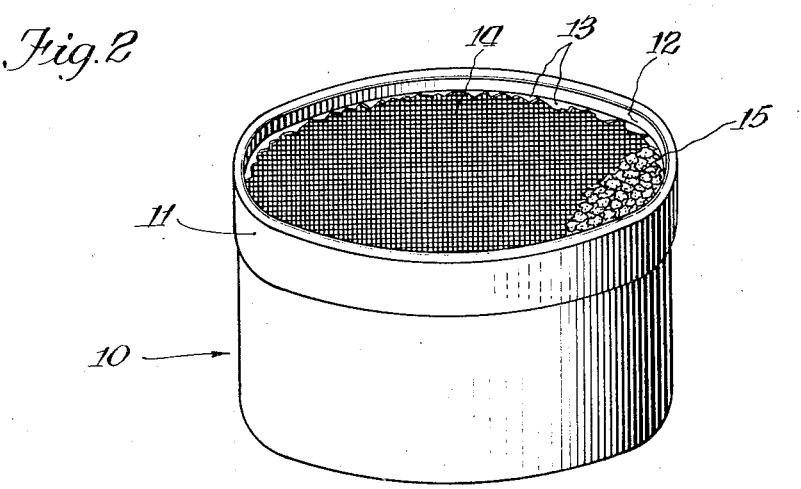
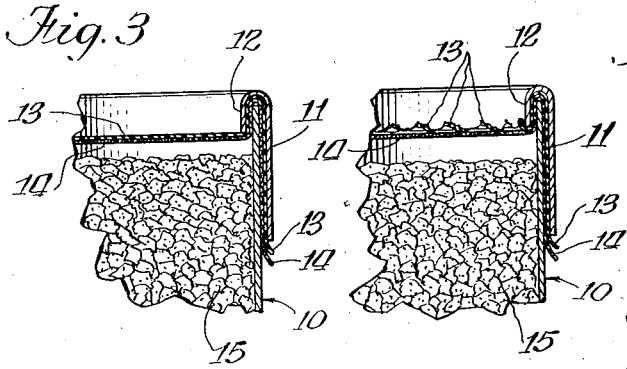
INVENTOR.
Earl L. Kaffer
BY
Archibald D. McKellar
Attorney.

Patented June 19, 1951

2,557,112

UNITED STATES PATENT OFFICE 2,557,112

COMBINED CONTAINER AND COVER

Earl L. Kaffer, Joliet, Ill.

Application February 6, 1947, Serial No. 726,772

2 Claims. (Cl. 229—43)

1

The invention relates to improvements in containers made from cardboard or the like, having cylindrical bodies and hoop-like cover members. The bottoms and covers of such containers are usually sealed with a disc of cardboard fitted to and held by an inwardly turned edge of the body and of the cover hoop. The invention further relates to containers having a cover through which the contents are visible while air-sealed, and has for its objects the provision of a container having means for quickly and easily changing the container from an air-sealed to an air-exposed condition without freeing the contents; and further, the provision of a device of this kind which will be simple and inexpensive as to material used, economical to manufacture and highly efficient and simple in use.

Other objects will appear hereinafter.

The invention consists in the combinations and arrangements of parts hereinafter described and claimed.

The invention will be best understood by reference to the accompanying drawings forming a part of this specification, and in which Figure 1 is a perspective view of a container equipped with an end closure embodying the invention in closed position;

Figure 2 is a perspective view of the closure with the air-sealing part removed;

Figure 3 is a fragmentary portion of the closure with the air-sealing portion in position for use; and Figure 4 is a fragmentary portion of the air-sealing cover with a portion removed and a cover of netting left intact.

The embodiment of the invention illustrated in the drawing comprises a container constructed of fibrous cardboard having a cylindrical body 10, closed at its bottom in the usual manner and provided at its top with removable rim member 11. A laminated closure having an outer sealing layer 13 of transparent cellophane or the like is assembled over an inner layer 14 of netlike material such as cotton netting or wire cloth having numerous meshes through which air is free to pass when a central portion of the outer layer 13 is removed.

Referring to the drawings, Figure 1 shows the container in use with the laminated closure in substantially air-tight condition, sealed by the outer layer 13 of cellophane, the inner layer 14 of netting underneath serving as a strengthening support against accidental spilling of contents by rupture of the outer layer 13.

The rim member 11 comprises an outwardly ar-

2 ranged hoop 11 of a diameter larger than that of the container body 10, and having an inwardly turned upper edge forming an inward lip 12 of a smaller diameter than that of the said body 10. By this arrangement a cover gripping means comprising a circumferential groove is formed between the inner wall of the hoop 11 and the outer wall of the container 10, and on the inner wall of the container 10 with the inner portion of the lip 12, as best shown in Figures 3 and 4.

A laminated closure as illustrated comprising an outer layer 13 of transparent cellophane or the like, is assembled over an inner layer of netting 14, preferably of a heavily sized cheesecloth or cloth of a similar texture.

Figure 2 shows the air-sealing layer of the cellophane 13 removed, leaving fragmentary portions clinging to the edge of the lip 12 after the center portion is torn away. This removal is quickly and easily accomplished by piercing with a pointed instrument and then tearing the cellophane away by thumb and finger grip; and also to illustrate the position of the contents a portion of the layer of netting has been removed showing the contents, which in this instance could be any granular material 15 commonly used as a deodorant when exposed to the air, and of a size large enough to be restrained by the layer of netting.

To apply the laminated cover of netting 14 and cellophane 13, the layer of netting 14 is laid upon the upper edge of the body 10 and the layer of cellophane 13 superimposed thereon. The rim member 11 is then pressed downwardly until firm. By this arrangement the two layers are forced into mutual folds and gripping contact, drawing both layers into taut condition. The smoothness of the cellophane layer 13 facilitates the assembling of the cover much as a lubricant would, and its pliability allows it to readily adjust itself to the meshes of the material and to folds incidental to confininng the extra material of the cover between the container body 10 and the inner side of the rim 11.

The specific arrangement of parts hereinbefore set forth discloses a container which may be used for articles other than deodorants, such as fruit, candies, or other commodities sold in such containers, and is a simple and effective one for the purpose. I therefore, do not wish to be limited to the precise details set forth, but desire to avail myself of such variations, uses and modifications as may fall within the spirit and scope of the appended claims.

I claim:

1. In combination with a container of the class described having a cylindrical side wall; a fixed closure at one end thereof; an integral hoop member having a downwardly depending skirt portion arranged and adapted to embrace the outer upper end portion of said cylindrical wall for a considerable extent thereof; an inwardly turned rolled rim at the upper end of said integral hoop member arranged and adapted to rest on the upper edge of said cylindrical side wall, the inner face of said rolled rim being parallel with the inner face of said cylindrical wall of said container; a lower inner layer of fabric and an outer sheet of soft plastic material superimposed thereon and substantially coextensive therewith, each having co-extending edge portions folded over the upper end of said cylindrical wall between the inwardly turned rolled rim and the outwardly embracing integral hoop member.

2. The construction specified in claim 1 in which the said layer of fabric and said layer of soft plastic are in juxtaposition and in draped arrangement over the upper end of said cylindrical side wall and between said integral hoop member, on the outer upper face portion thereof, and the upper inner face of said side wall and said inwardly turned rolled rim.

EARL L. KAFFER.

REFERENCES CITED

The following references are of record in the file of this patent:

UNITED STATES PATENTS

| Number | Name | Date |
|---|---|---|
| 1,695,104 | Huntley | Dec. 11, 1928 |
| 1,851,891 | Morris | Apr. 5, 1932 |
| 1,954,306 | Wright | Apr. 10, 1934 |
| 2,118,591 | Clark | May 24, 1938 |
| 2,200,200 | Donnelly | May 7, 1940 |